(12) United States Patent
Whitney et al.

(10) Patent No.: US 10,500,913 B1
(45) Date of Patent: Dec. 10, 2019

(54) SHOCK ABSORBING EQUALIZER FOR SUSPENSION SYSTEM

(71) Applicant: LIPPERT COMPONENTS, INC., Elkhart, IN (US)

(72) Inventors: Evan Whitney, Edwardsburg, MI (US); Dominick Bilancio, Elkhart, IN (US)

(73) Assignee: LIPPERT COMPONENTS, INC., Elkhart, IN (US)

( * ) Notice: Subject to any disclaimer, the term of this patent is extended or adjusted under 35 U.S.C. 154(b) by 8 days.

(21) Appl. No.: 16/050,615

(22) Filed: Jul. 31, 2018

(51) Int. Cl.
*B60G 11/12* (2006.01)
*B60G 5/047* (2006.01)
*B60G 5/00* (2006.01)

(52) U.S. Cl.
CPC .............. *B60G 5/00* (2013.01); *B60G 5/047* (2013.01); *B60G 11/12* (2013.01); *B60G 2200/318* (2013.01); *B60G 2204/121* (2013.01); *B60G 2204/4502* (2013.01); *B60G 2204/8302* (2013.01)

(58) Field of Classification Search
CPC . B60G 5/04; B60G 5/047; B60G 5/00; B60G 5/06; B60G 11/12; B60G 21/045; B60G 2200/318; B60G 2204/121; B60G 2204/8302
USPC ................................................. 280/682, 686
See application file for complete search history.

(56) References Cited

U.S. PATENT DOCUMENTS

| 380,548 A | 4/1888 | Broadhurst |
| 2,170,454 A | 8/1939 | Larison |
| 2,719,728 A | 10/1955 | Boyles |
| 2,811,213 A | 10/1957 | Miller |
| 2,957,058 A | 10/1960 | Trott |
| 3,003,781 A | 10/1961 | Black |
| 3,074,738 A | 1/1963 | Ward |
| 3,178,201 A | 4/1965 | Richnow, Jr. |
| 3,195,916 A | 7/1965 | Cain |
| 3,410,572 A | 11/1968 | Poulos |
| 3,469,860 A * | 9/1969 | Hutchens ............... B60G 5/047 280/682 |
| 3,499,660 A | 3/1970 | Raidel |
| 3,504,929 A | 4/1970 | King |
| 3,572,745 A | 3/1971 | Willetts |
| 3,738,631 A * | 6/1973 | Haley .................... B60G 5/047 267/52 |
| 3,767,222 A | 10/1973 | Willetts |
| 3,799,562 A | 3/1974 | Hinchliff |
| 3,856,325 A | 12/1974 | Willetts |
| 4,030,738 A | 6/1977 | Willetts |
| 4,033,606 A | 7/1977 | Ward et al. |

(Continued)

OTHER PUBLICATIONS

Printout from www.truckspring.com website detailing Timbren Ride Control; Two (2) pages; Jun. 3, 2002.

(Continued)

*Primary Examiner* — Ruth Ilan
(74) *Attorney, Agent, or Firm* — Nixon & Vanderhye P.C.

(57) ABSTRACT

An equalizer for a suspension system includes a pivot arm pivotably connected to first and second plates at a pivot point, first and second bump stops connected between the first and second plates on one side of the pivot point, and third and fourth bump stops connected between the first and second plates on the other side of the pivot point. First through fourth shock absorbers are disposed between the pivot arm and the first through fourth bump stops, respectively.

18 Claims, 6 Drawing Sheets

(56) References Cited

U.S. PATENT DOCUMENTS

| | | |
|---|---|---|
| 4,195,863 A | 4/1980 | Richardson |
| 4,270,765 A | 6/1981 | Legueu |
| 4,278,271 A | 7/1981 | Raidel |
| 4,371,189 A | 2/1983 | Raidel |
| 4,502,707 A | 3/1985 | Jable et al. |
| 4,504,079 A | 3/1985 | Strong |
| 4,570,971 A | 2/1986 | Perlini |
| 4,630,803 A | 12/1986 | Werner et al. |
| 4,676,523 A | 6/1987 | Rogers |
| 5,234,067 A | 8/1993 | Simard |
| 5,431,260 A | 7/1995 | Gross et al. |
| 5,486,807 A | 1/1996 | Price |
| 5,662,314 A | 9/1997 | Stoltzfus |
| 5,697,172 A | 12/1997 | Verseef |
| 5,951,032 A | 9/1999 | Overby et al. |
| 5,975,505 A | 11/1999 | Yoshimoto et al. |
| 6,015,158 A | 1/2000 | Overby et al. |
| 6,092,819 A | 7/2000 | Overby et al. |
| 6,220,585 B1 | 4/2001 | Heron |
| 6,478,321 B1 | 11/2002 | Heitzmann |
| 7,144,031 B2 | 12/2006 | Fenton |
| 7,296,821 B2 * | 11/2007 | Fenton ............... B60G 5/047 280/680 |
| 7,918,478 B2 | 4/2011 | Fenton |
| 10,239,372 B2 * | 3/2019 | Bilancio ............ B60G 11/10 |
| 2004/0119260 A1 | 6/2004 | Fenton |
| 2008/0036182 A1 * | 2/2008 | Fenton ............... B60G 5/00 280/682 |
| 2014/0117639 A1 * | 5/2014 | Ramsey ............. B60G 5/00 280/124.11 |
| 2017/0349019 A1 | 12/2017 | Bilancio et al. |

OTHER PUBLICATIONS

Printout of MOR/ryde Rubber Equalizer Suspension System Installation Instructions; Six (6) pages.

Printout of Dexter Axle's Hagner and Attaching Parts Kits; Two (2) pages.

Printout from www.al-kousa.com website detailing leaf spring axles; One (1) page. (Nov. 17, 2005).

Printout of the Hutch 9700 Trailer Suspension Series; Four (4) pages.

Printout of the Holland Group's Mechanical Suspension Series; Two (2) pages.

Printout from www.transport.tuthull.com website detailing Four Spring Van Slider Sluspension; One (1) page.

Printout from www. trailair.com detailing center point suspension; Three (3); 2002.

Printout of Brochure: Timbren Silent Ride Trailer Suspension.

\* cited by examiner

SHOCK ABSORBING EQUALIZER FOR SUSPENSION SYSTEM

BACKGROUND AND SUMMARY OF THE DISCLOSURE

Shock absorbing equalizers for trailer suspension systems are known in the art. Such equalizers typically include two rigid members configured to pivot with respect to each other and a resilient member that is compressible and decompressible between the two rigid members. For example, such equalizers may include a rigid pivot arm disposed within and configured to pivot with respect to a rigid body. A rubber shock absorber may be disposed between the pivot arm and the body. Although such equalizers are effective, they may place considerable radial loads upon the pivot joint between the pivot arm and the housing.

An improvement to such equalizers, disclosed in commonly-owned U.S. patent application Ser. No. 15/608,651, filed on May 30, 2017, and published as U.S. Patent Application Publication No. US 2017/0349019 A1 ("the '019 publication"), the disclosure of which is incorporated herein by reference in its entirety, includes a second shock absorber between the pivot arm and the housing, on the opposite side of the pivot arm from the first shock absorber. Although such equalizers may place lesser radial loads upon the pivot joint between the pivot arm and the housing, they tend to be taller than equalizers having only a first shock absorber between the pivot arm and the housing. This may limit the number and variety of applications in which such equalizers can be used based on packaging limitations.

The present disclosure is directed to further improvements to such equalizers.

DETAILED DESCRIPTION OF THE DRAWINGS

Figure 1:
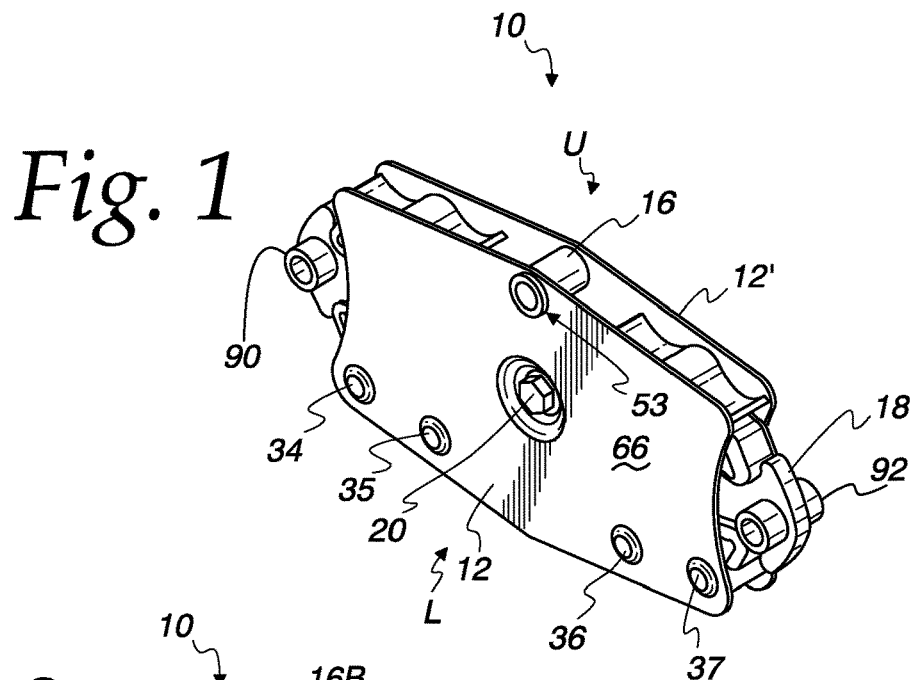
FIG. 1 is a perspective view of a shock absorbing equalizer according to the present disclosure.

References to orientation and direction, for example, upper, lower, inner, outer, front, rear, and the like, as may be used herein should be construed to refer to relative, rather than absolute, orientation and direction, unless context clearly dictates otherwise. Dimensions that may be shown in the drawings are illustrative and not limiting.

The drawings show an illustrative embodiment of an equalizer 10 for use in a suspension system including multiple axles, for example, a tandem axle suspension system as might be used on a trailer.

Figure 2:
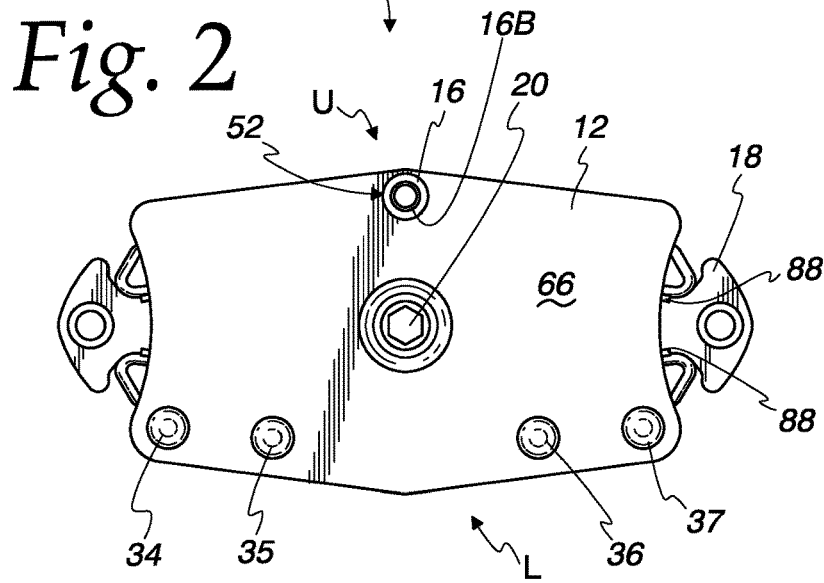
FIG. 2 is a side elevation view of the shock absorbing equalizer of FIG. 1.
Figure 3:
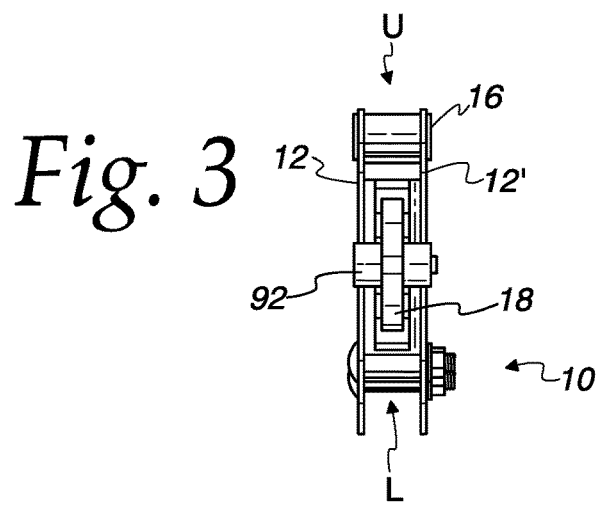
FIG. 3 is an end elevation view of the shock absorbing equalizer of FIG. 1.
Figure 4:
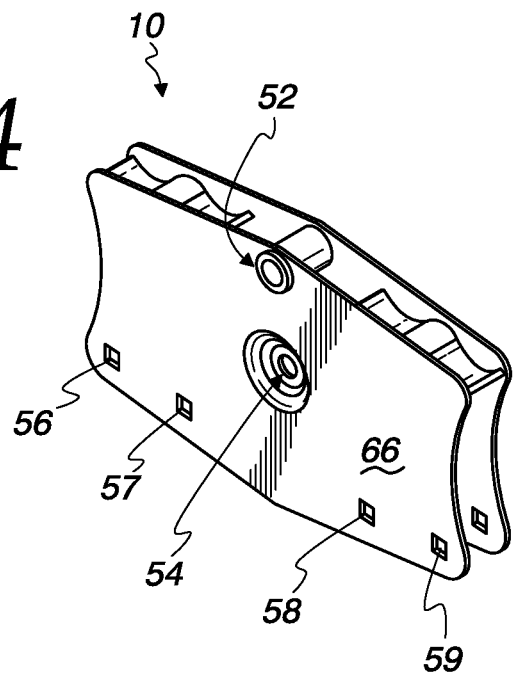
FIG. 4 is a perspective view of a housing of the shock absorbing equalizer of FIG. 1.

With reference to FIGS. 1-3, the illustrative equalizer 10 includes a first plate 12 and a second plate 12'. The second plate 12' may be identical to or the mirror image of the first plate 12. As such, only the first plate 12 will be described in detail herein. Features of the second plate 12' corresponding to the features of the first plate 12 described herein may be shown in the drawings using similar but primed reference signs.

The first plate 12 and the second plate 12' are fixedly connected together proximate first (or upper or mounting) ends U thereof by an intervening mounting sleeve 16. A pivot arm 18 is pivotally mounted to the first plate 12 and the second plate 12' by a pivot bolt 20 and complementary washer (not shown) and nut (not shown).

A first bump stop 26 is disposed between the first plate 12 and the second plate 12' and fixedly attached to at least one of the first plate and the second plate. A first shock absorber 28 is disposed between, and may be selectively compressed between, the pivot arm 18 and the first bump stop 26. A second bump stop 27 is disposed between the first plate 12 and the second plate 12' and fixedly attached to at least one of the first plate and the second plate. A second shock absorber 29 is disposed between, and may be selectively compressed between, the pivot arm 18 and the second bump stop 27. A third bump stop 30 is disposed between the first plate 12 and the second plate 12'. The third bump stop 30 may be, but need not be, fixedly attached to at least one of the first plate 12 and the second plate 12'. A third shock absorber 32 is disposed between, and may be selectively compressed between, the second bump stop 30 and the pivot arm 18. A fourth bump stop 31 is disposed between the first plate 12 and the second plate 12'. The fourth bump stop 31 may be, but need not be, fixedly attached to at least one of the first plate 12 and the second plate 12'. A fourth shock absorber 33 is disposed between, and may be selectively compressed between, the third bump stop 31 and the pivot arm 18.

The first plate 12 and the second plate 12' are fixedly connected together proximate second (or lower or free) ends L thereof by first, second, third, and fourth carriage bolts 34, 35, 36, 37 and complementary washers (not shown) and nuts (not shown). In embodiments wherein the third and fourth bump stops 30, 31 are not fixedly attached to the first plate 12 or the second plate 12', the third bump stop may be supported between the third shock absorber 32 and the carriage bolts 34, 35, and the fourth bump stop may be supported between the fourth shock absorber 33 and the carriage bolts 36, 37.

As best shown in FIGS. 1, 2, 4, and 5, the first plate 12 includes a first (or upper or mounting) end section 46 proximate the upper end U thereof and a second (or lower or free) end section 48 proximate the lower end L thereof. The first and second end sections 46, 48 are connected by an intermediate section 50 having an hourglass shape. That is, the intermediate section 50 includes relatively broad upper and lower shoulders proximate the upper and lower end sections 46, 48, respectively, and it tapers to a relatively narrow waist between the upper and lower shoulders.

The first plate 12 defines a first (or upper or mounting) aperture 52 proximate the upper end U thereof. The first plate 12 also defines a second (or pivot bolt) aperture 54. The first plate 12 further defines third, fourth, fifth, and sixth (or lower or carriage bolt) apertures 56, 57, 58, 59 proximate the transition between the lower section 48 and intermediate section 50 thereof.

The first plate 12 may be generally planar. In the illustrated embodiment, the first plate 12 is generally planar but defines a lobe 60 and a complementary countersunk portion (or countersink) 62 about the pivot arm aperture 54. The lobe 60 extends proud of a first (or inner) surface 64 of the first plate 12, and the countersink 62 is recessed from a second (or outer surface) 66 of the first plate.

Figure 6:
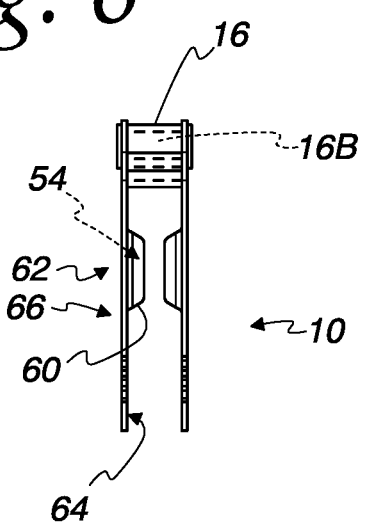
FIG. 6 is an end elevation view of the housing of the shock absorbing equalizer of FIG. 1.
Figure 5:
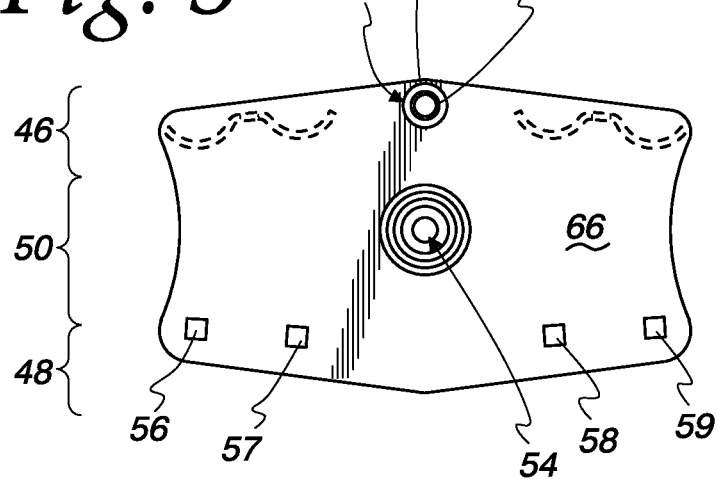
FIG. 5 is a side elevation view of the housing of the shock absorbing equalizer of FIG. 1.

As best shown in FIGS. 3 and 6, the first plate 12 and the second plate 12' may be arranged parallel to and a predetermined distance apart from each other so that respective ones of the mounting apertures 52, 52', the pivot arm apertures 54, 54', and the carriage bolt apertures 56, 56', 57, 57', 58, 58', 59, 59' are coaxial with each other, and so that the lobes 60, 60' face inwardly toward each other. So configured and aligned, the first plate 12 and the second plate 12' may be fixed to each other by means of the mounting sleeve 16. For example, a first end of the mounting sleeve 16 may be received within the mounting aperture 52 of the first plate 12 and fixed thereto by welding. Similarly, a second end of the mounting sleeve 16 may be received within the mounting aperture 52' of the second plate 12' and fixed thereto by welding. In other embodiments, the mounting sleeve 16 could be fixed to the first plate 12 and/or the second plate 12' in other ways. A corresponding bushing 16B, for example, a bronze bushing, may be received within the mounting sleeve 16.

Figure 11:
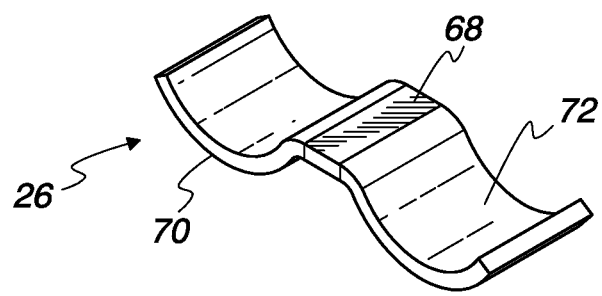
FIG. 11 is a perspective view of a bump stop of the shock absorbing equalizer of FIG. 1.
Figure 12:
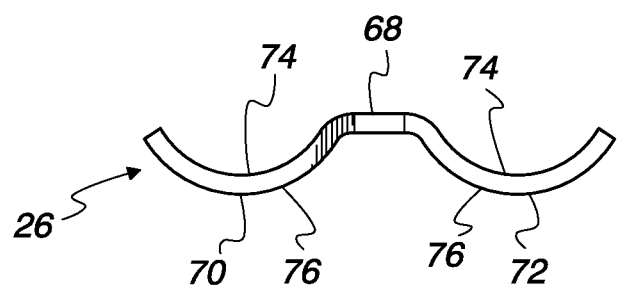
FIG. 12 is a side elevation view of the bump stop of FIG. 9.

With reference to FIGS. 11 and 12, the first bump stop 26 is shown as a plate of substantially uniform thickness formed into a flattened and rounded W shape. More specifically, the first bump stop 26 is shown as having a generally flat intermediate portion 68 flanked by first and second curved portions 70, 72, respectively. As shown, the first and second curved portions 70, 72 each define a concave upper (or first) surface 74 and a convex lower (or second or bearing) surface 76. The second, third, and fourth bump stops 27, 30, 31 may be identical to or the mirror image of the first bump stop 26 or may be configured in another manner.

Figure 7:
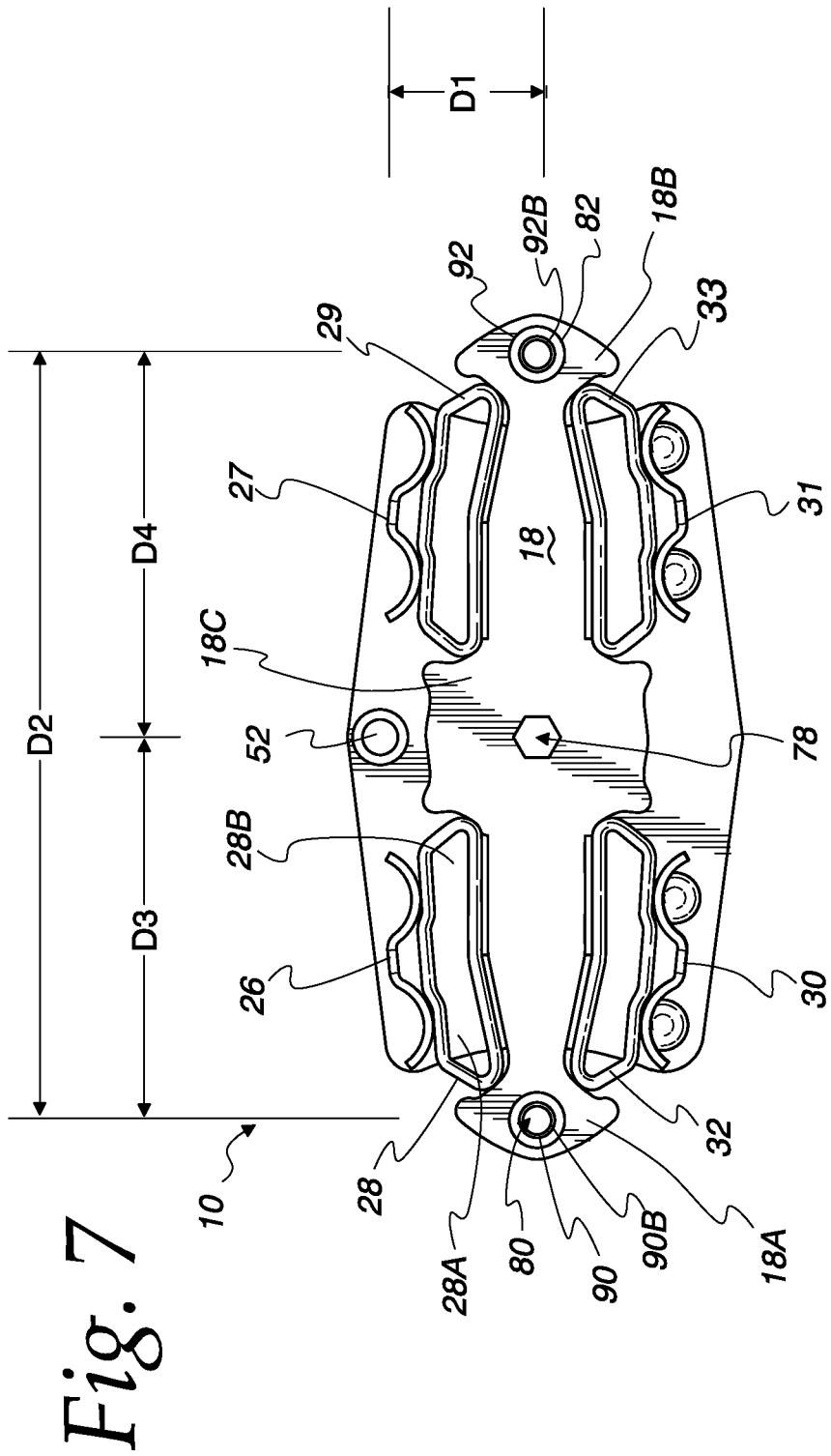
FIG. 7 is a side elevation view of the shock absorbing equalizer of FIG. 1 with a plate of the housing removed.

With reference to FIG. 7, the first through fourth bump stops 26, 27, 30, 31 may extend from one of the first plate 12 and the second plate 12' to or toward the other of the first plate and the second plate, generally perpendicular thereto. Any or all of the first through fourth bump stops 26, 27, 30, 31 may be discrete elements post-attached to one or both of the plates 12, 12', for example, by welding. Alternatively, any or all of the first through fourth bump stops 26, 27, 30, 31 may be monolithically formed with either or both of the first and second side plates 12, 12'. For example, the first plate 12 and any one more of the first through fourth bump stops 26, 27, 30, 31 could be cast as a unitary member. Similarly, The second plate 12' and any other one more of the first through fourth bump stops 26, 27, 30, 31 could be formed in a similar manner so as to mate with the first plate 12 and the any one more of the first through fourth bump stops 26, 27, 30, 31.

Figure 8:
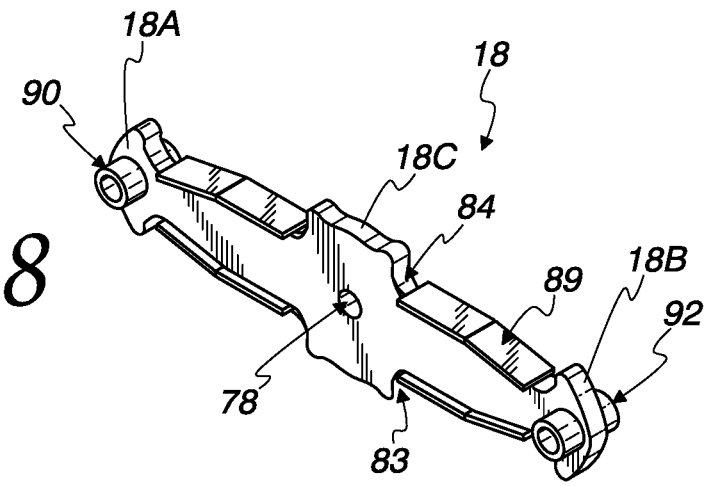
FIG. 8 is a perspective view of a pivot arm of the shock absorbing equalizer of FIG. 1.
Figure 9:
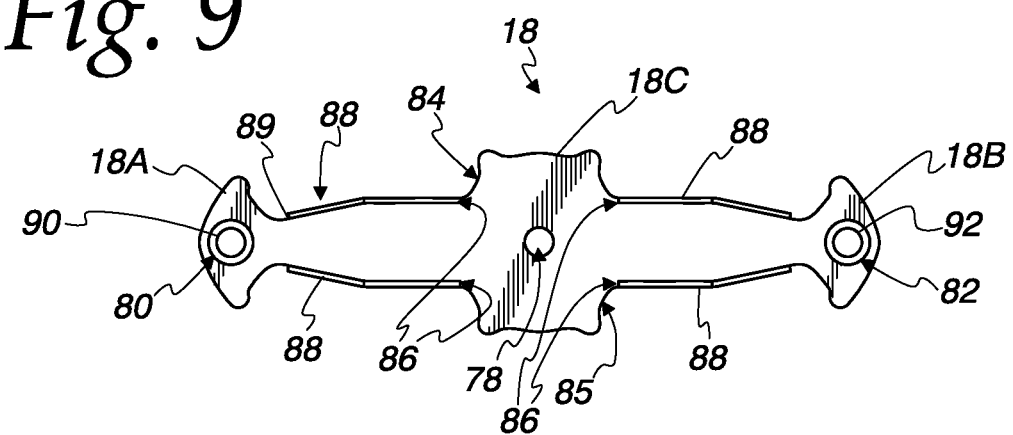
FIG. 9 is a side elevation view of the pivot arm of FIG. 8.
Figure 10:
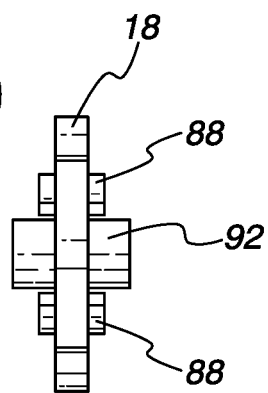
FIG. 10 is an end elevation view of the pivot arm of FIG. 8.

With reference to FIGS. 8-10, the pivot arm 18 is shown as an elongated, generally planar plate having a first end section 18A and a second end section 18B connected by an intermediate section 18C. The first end section 18A is generally annular and defines a first pivot arm aperture 80 there through. Similarly, the second end section 18B is generally annular and defines a second pivot arm aperture 82 there through. The intermediate section 18C is generally elongated oval-shaped, and it defines a third (or intermediate) pivot arm aperture 78 there through, generally intermediate the first and second ends of the pivot arm 18 and the first and second pivot arm apertures 80, 82 defined thereby.

The pivot arm 18 defines first and second (or upper and lower) peripheral edge surfaces 84, 85. Each of the first and second edge surfaces 84, 85 defines first and second generally rectangular notches 86. A respective push plate 88 is received in each of the notches 86 and extends laterally from and is fixed to the pivot arm 18. Each of the push plates 88 may be embodied as one or more discrete pieces of material. The push plates 88 may be fixed to the pivot arm 18 by welding or another suitable means. An outer surface 89 of each of the push plates 88 may be substantially flush with the corresponding edge surface 84, 85 of the pivot arm 18. The outer surface 89 may have a width substantially greater than that of the edge surface 84, 85 to which it is attached, thereby serving to effectively increase the area of the pivot arm 18 that may bear against the first and second shock absorbers 28, 32, as is evident from FIG. 2 and as will be discussed further below.

A first pivot arm sleeve 90 is received by the first pivot arm aperture 80 and fixed to the pivot arm 18, for example, by welding. Similarly, a second pivot arm sleeve 92 is received by the second pivot arm aperture 82 and fixed to the pivot arm 18, for example, by welding. In other embodiments, one or both of the pivot arm sleeves 90, 92 could be fixed to the pivot arm 18 by other means.

In an embodiment, two or more of the plate of the pivot arm 18, the push plates 88, the first pivot arm sleeve 90, and the second pivot arm sleeve 92 could be formed monolithically, for example, by casting. For example, a pivot arm comprising the features of the pivot arm 18, the push plates 88, and the first and second pivot arm sleeves 90, 92 could be cast as a unitary member.

Each of the first and second pivot arm sleeves 90, 92 may be substantially longer than the plate of the pivot arm 18 is thick. As such, first and second ends of the first and second pivot arm sleeves 90, 92 may extend substantially beyond the ends of the respective apertures 80, 82 in the pivot arm 18. As shown in FIG. 7, first and second bushings 90B, 92B, for example, bronze bushings, may be disposed within the respective ones of the first and second pivot arm sleeves 90, 92.

As mentioned above, the pivot arm 18 is pivotally attached to the first and second plates 12, 12' by the pivot bolt 20 extending through the intermediate aperture 54' of the second plate 12', the intermediate pivot arm aperture 78, and the intermediate aperture 54 of the first plate 12. The pivot bolt 20 may be secured to the first and second plates 12, 12' and the pivot arm 18 with a complementary washer and nut (not shown). So attached, the pivot arm 18 may be in pivotal engagement with the lobes 60, 60' of the first and second plates 12, 12', or loosely disposed there between. In an embodiment, the pivot arm 18 and the pivot bolt 20 could be formed monolithically.

With reference to FIG. 7, the first shock absorber 28 is shaped like a flattened heart symbol (♥), having first and second lobes 28A, 28B. Each of the first and second lobes 28A, 28B defines a first corresponding edge surface configured for selective compressive engagement with a corresponding edge surface 84, 85 of the pivot arm and the corresponding push plate 88 attached to the pivot arm. Each of the first and second lobes 28A, 28B also defines a second corresponding edge surface configured for selective compressive engagement with the first bump stop 26. The second through fourth shock absorbers 29, 32, 33 may be similarly configured. Each of the first through fourth shock absorbers 28, 29, 32, 33 may be made of rubber or another suitable resiliently compressible material. The material's durometer may be selected as desired for an intended application. In an embodiment, the durometer of each of first through fourth shock absorbers 28, 29, 32, 33 may be the same. In other embodiments, the durometer of any of the first through fourth shock absorbers 28, 29, 32, 33 may be different from the durometer of any or every other of the first through fourth shock absorbers 28, 29, 32, 33.

As best shown in FIG. 7, the first shock absorber 28 is disposed between the pivot arm 18 and the first bump stop 26, with a first surface of the first shock absorber in abutment with or adjacent to the edge surface 84 of the pivot arm (or a push plate 88 attached to the pivot arm, for example, as discussed above) and a second surface of the shock absorber in abutment with or adjacent to the bearing surface(s) of the first bump stop. The second through fourth shock absorbers 29, 32, 33 may be similarly disposed between the pivot arm 18 and the second through fourth bump stops 27, 30, 31.

The plates 12, 12', the bump stops 26, 27, 30, 31 and components of the pivot arm 18 may be made of steel or another suitable, rigid material.

Figure 13:
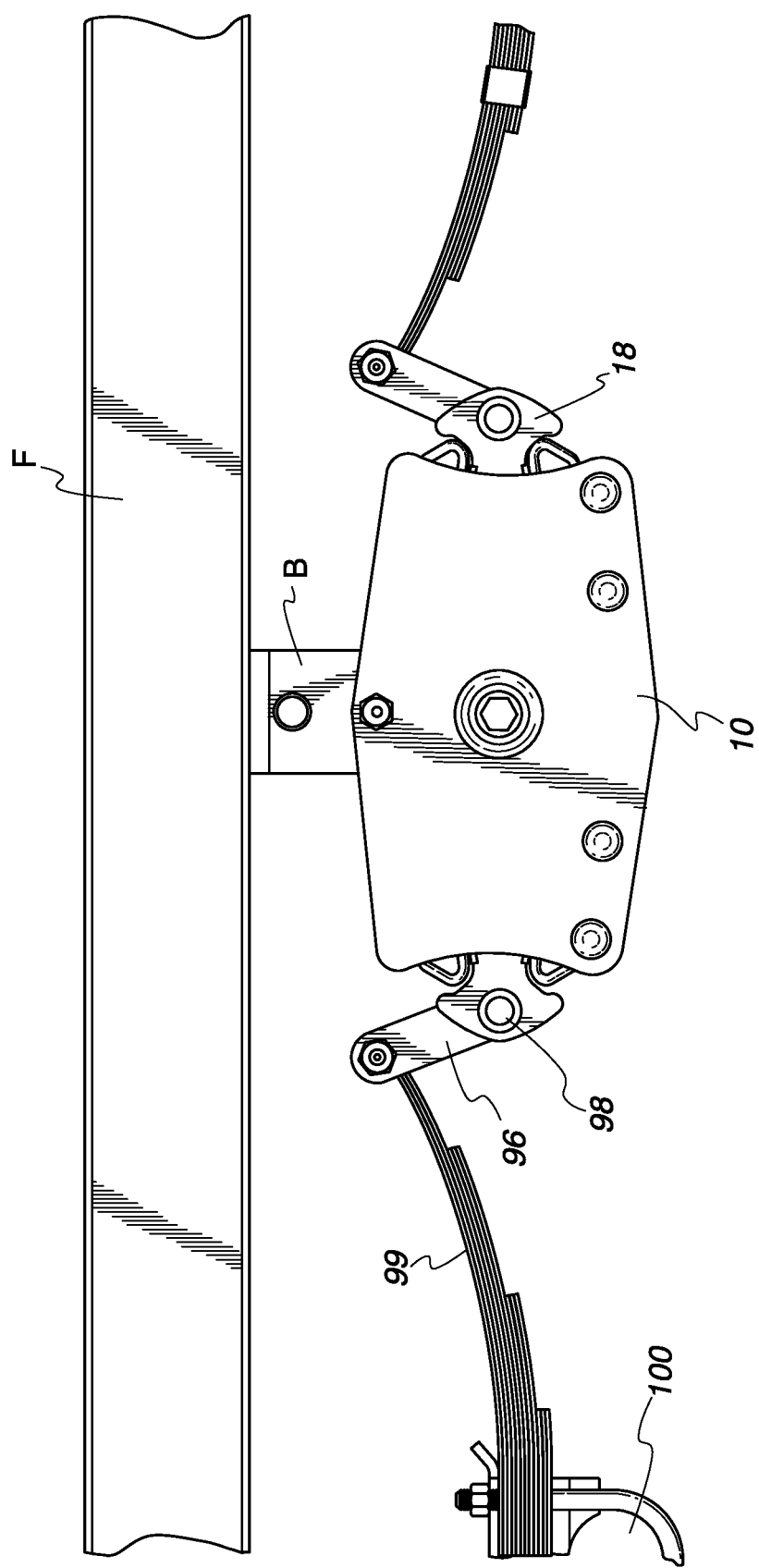
FIG. 13 is side elevation view of the shock absorbing equalizer of FIG. 1 installed in a vehicle.

The equalizer 10 may be installed in a vehicle by attaching the mounting sleeve 16 to a frame of the vehicle, either directly or through a bracket or other intervening structure, and attaching the pivot arm sleeves 90, 92 to first and second axles of the vehicle, either directly, or though intervening shackles or brackets. For example, as shown in FIG. 13, the equalizer 10 may be pivotally mounted to a frame F of a vehicle through an intervening bracket B having a web attached to the frame and a pair of generally parallel flanges extending from the frame and the web by means of a mounting pivot pin 94 extending through the mounting sleeve 16 aperture and one or more corresponding apertures in the flanges of the bracket. The first end of the pivot arm 18 may be pivotally attached to a first spring shackle 96 by means of a first pivot pin 98 extending through the aperture of the first pivot arm sleeve 90 and one or more corresponding apertures in the first spring shackle. The first spring shackle 96 may be similarly pivotally attached to a first spring 99 supporting a first axle 100. Similarly, the second end of the pivot arm 18 may be pivotally attached to a second spring shackle by means of a second pivot pin extending through the aperture of the second pivot arm sleeve 92 and one or more corresponding apertures in the second spring shackle. The second spring shackle may be similarly pivotally attached to a second spring supporting a second axle.

In use, application of a first moment to the pivot arm 18 in a first direction (clockwise with reference to, for example, FIGS. 2 and 7) with respect to the first and second plates 12, 12' causes the pivot arm to pivot in a first direction with respect to the plates, thereby compressing the first and fourth shock absorbers 28, 33 between the pivot arm and the corresponding first and fourth bump stops 26, 31, and decompressing the second and third shock absorbers 29, 32. Application of a second moment to the pivot arm 18 in a second direction opposite the first direction with respect to the plates 12, 12' causes the pivot arm to pivot in a second direction with respect to the plates, thereby compressing the second and third shock absorbers 29, 32 between the pivot arm and the corresponding second and third bump stops 27, 30, and decompressing the first and fourth shock absorbers 28, 33. When either of the first and second moments is released, the compressed ones of the first through fourth shock absorbers 28, 29, 32, 33 tend to decompress, thereby applying an opposite moment to the pivot arm 18 with respect to the plates 12, 12' and returning the pivot arm to or toward its original position with respect to the plates.

In some embodiments, any or all of the first through fourth shock absorbers 28, 29, 32, 33 may be fixed to one or more of the first and second plates 12, 12' and the respective first through fourth bump stops 26, 27, 30, 31 by a vulcanizing process or another process or mechanism.

The equalizer 10 may provide numerous advantages over the equalizers mentioned in the Background section, above. For example, because the first and second shock absorbers 28, 29 are discrete elements disposed on respective sides of the center portion 18C of the pivot arm, rather than straddling the center portion of the pivot arm, and because the first and second bump stops 26, 27 are located substantially beside the mounting aperture 52 and the third pivot arm aperture 78, rather than between the mounting aperture and the third pivot arm aperture, the distance D1 between the mounting aperture 52 and the third pivot arm aperture 78 may be substantially shorter than the corresponding distance in the equalizer disclosed in the '019 publication, and the distance D2 between the first and second pivot arm apertures 80, 82 of the pivot arm 18 may be substantially greater than the corresponding distance in the equalizer disclosed in the '019 publication. Accordingly, the ratio D2/D1 of the equalizer 10 may be substantially greater than the corresponding ratio of the equalizer disclosed in the '019 application. For example, the ratio D2/D1 of the equalizer 10 may be in the range of 1.5-2.5 or more or less, whereas the corresponding ratio of the equalizer disclosed in the '019 application may be about 1 or more or less. Alternatively, the distance D1 may be about 10% to 90% of the distance D2, or about 20% to 80% of the distance D2, or about 30% to 70% of the distance D2, or about 40% to 60% of the distance D2 or about 50% of the distance D2. The distance D3 between the first pivot arm aperture 80 and the third pivot arm aperture 78 may be substantially the same as, substantially greater than, or substantially less than the distance D4 between the second pivot arm aperture 82 and the third pivot bolt aperture 78.

Consequently, the profile of the equalizer 10 may be substantially lower than the profile of the equalizer disclosed in the '019 publication. More specifically, whereas the equalizer disclosed in the '019 application is substantially taller than it is wide, the equalizer 10 may be substantially wider than it is tall. This feature may permit use of the equalizer 10 in applications where the equalizer disclosed in the '019 publication might not be suitable.

Also, because the distance D2 of the pivot arm 18 of the equalizer 10 may be substantially longer than the corresponding distance of the pivot arm of the equalizer disclosed in the '019 publication, the pivot arm 18 may engage the shock absorbers 28, 29, 32, 33 over a greater length than the length over which the pivot arm of the equalizer disclosed in the '019 publication may engage the shock absorbers thereof. This feature may permit more predictable and consistent loading and unloading of the shock absorbers 28, 29, 32, 33 of the equalizer 10 compared to the shock absorbers of the equalizer disclosed in the '019 application.

Further, as mentioned above, the durometer of each of the shock absorbers 28, 29, 32, 33 of the equalizer 10 may be different from the durometer of any other of the shock absorbers, thus allowing a designer more latitude in tailoring the characteristics of the equalizer to a specific application.

Moreover, the first and second shock absorbers 28, 29 of the equalizer 10 may, in combination comprise substantially less material than a single shock absorber straddling the center portion 18C of the pivot arm. Similarly, the second and third shock absorbers 32, 33 of the equalizer 10 may, in combination comprise substantially less material than a single shock absorber straddling the center portion 18C of the pivot arm. This feature may reduce material cost and weight.

Certain illustrative embodiments are shown and described herein. Features disclosed in connection with a given embodiment may be incorporated into another embodiment, and the embodiments may be otherwise modified to the greatest extent possible. Such embodiments are not intended to limit the scope of the invention as defined by the appended claims.

The invention claimed is:

1. An equalizer for a suspension having first and second axles, the equalizer mountable to a frame of a vehicle in pivotable engagement with the frame about a mounting pivot axis, the equalizer comprising:
   a first plate;
   a second plate spaced from, fixed to, and generally parallel to the first plate;
   a first bump stop extending from at least one of the first plate and the second plate to or toward the other of the first plate and the second plate;
   a second bump stop extending from at least one of the first plate and the second plate to or toward the other of the first plate and the second plate;
   a third bump stop extending from at least one of the first plate and the second plate to or toward the other of the first plate and the second plate;
   a fourth bump stop extending from at least one of the first plate and the second plate to or toward the other of the first plate and the second plate;
   a pivot arm having first and second ends and an intermediate portion, the first end configured for pivotal attachment to the first axle about a first pivot arm pivot point, the second end configured for pivotal attachment to the second axle about a second pivot arm pivot point, and the intermediate portion pivotally connected to the first plate and the second plate about a third pivot arm pivot point;
   a first shock absorber disposed between the first bump stop and the pivot arm;
   a second shock absorber disposed between the second bump stop and the pivot arm;
   a third shock absorber disposed between the first bump stop and the pivot arm; and
   a fourth shock absorber disposed between the second bump stop and the pivot arm;
   wherein the first and third shock absorbers straddle the intermediate portion of the pivot arm relatively near the first end of the pivot arm and the second and fourth shock absorbers straddle the intermediate portion of the pivot arm relatively near the second end of the pivot arm; and
   wherein pivoting of the pivot arm with respect to the pivot arm pivot axis in a first direction of rotation results in compression of both the first shock absorber and the fourth shock absorber, and wherein pivoting of the pivot arm with respect to the pivot arm pivot axis in a second direction of rotation results in compression of both the second shock absorber and the third shock absorber.

2. The equalizer of claim 1 wherein the distance between the first end of the pivot arm and the second end of the pivot arm is substantially greater than the distance between the first bump stop and the third bump stop and the distance between the second bump stop and the fourth bump stop.

3. The equalizer of claim 1 wherein the first pivot arm pivot point and the second pivot arm pivot point are equidistant from the pivot arm pivot axis.

4. The equalizer of claim 1 wherein one of the first pivot arm pivot point and the second pivot arm pivot point is nearer to the pivot arm pivot axis than is the other of the first pivot arm pivot point and the second pivot arm pivot point.

5. The equalizer of claim 1 wherein the pivot arm defines a first trough receiving a portion of the first shock absorber and configured to inhibit lateral motion of the first shock absorber with respect to the first pivot arm.

6. The equalizer of claim 5 wherein the pivot arm defines one or more of:
   a second trough receiving a portion of the second shock absorber and configured to inhibit lateral motion of the second shock absorber with respect to the first pivot arm;
   a third trough receiving a portion of the third shock absorber and configured to inhibit lateral motion of the third shock absorber with respect to the first pivot arm; and
   a fourth trough receiving a portion of the fourth shock absorber and configured to inhibit lateral motion of the fourth shock absorber with respect to the first pivot arm.

7. The equalizer of claim 6 wherein each trough comprises a bottom and two sides.

8. The equalizer of claim 1 wherein a first distance between the mounting pivot axis point and the third pivot arm pivot axis is substantially less than a second distance between the first pivot arm pivot axis and the second pivot arm pivot axis.

9. The equalizer of claim 8 wherein the first distance is between about 10% and 90% of the second distance.

10. The equalizer of claim 8 wherein the first distance is between about 20% and 80% of the second distance.

11. The equalizer of claim 8 wherein the first distance is between about 30% and 70% of the second distance.

12. The equalizer of claim 8 wherein the first distance is between about 40% and 60% of the second distance.

13. The equalizer of claim 8 wherein the first distance is between about 45% and 65% of the second distance.

14. The equalizer of claim 1 further comprising a push plate operably associated with the pivot arm and the first shock absorber wherein substantially the entirety of the surface of the first shock absorber facing the pivot arm bears against the push plate.

15. The equalizer of claim 1 wherein at least one of the first bump stop and the second bump stop is monolithically formed with at least one of the first plate and the second plate.

16. The equalizer of claim 1 further comprising a mounting sleeve connecting the first plate to the second plate, the mounting sleeve configured for pivotal connection to the frame of the vehicle, wherein the mounting sleeve defines the mounting pivot axis.

17. The equalizer of claim 1 wherein the first plate defines a first aperture and the second plate defines a second aperture corresponding to and in registration with the first aperture, the equalizer further comprising a first mechanical fastener extending through the first aperture and the second aperture, wherein the first plate, the second plate, and the first mechanical fastener cooperate with any one of the first shock absorber, the second shock absorber, the third shock absorber, and the fourth shock absorber cooperate to capture the respective one of the first bump stop, the second bump stop, the third bump stop, and the fourth bump stop therebetween.

18. The equalizer of claim 17 wherein the first plate defines a third aperture and the second plate defines a fourth aperture corresponding to and in registration with the third aperture, the equalizer further comprising a second mechanical fastener extending through the third aperture and the fourth aperture, wherein the second mechanical fastener cooperates with the first plate, the second plate, the first mechanical fastener mechanical fastener and the any one of the first shock absorber, the second shock absorber, the third shock absorber, and the fourth shock absorber cooperate to further capture the respective one of the first bump stop, the second bump stop, the third bump stop, and the fourth bump stop therebetween.

* * * * *